US009292713B2

(12) United States Patent
Sandri et al.

(10) Patent No.: US 9,292,713 B2
(45) Date of Patent: Mar. 22, 2016

(54) TIERED ACCESS TO ON CHIP FEATURES

(71) Applicant: Intel Corporation, Santa Clara, CA (US)

(72) Inventors: Jason G. Sandri, Gilbert, AZ (US); Monib Ahmed, Chandler, AZ (US); Ian S. Walker, Pennsburg, PA (US)

(73) Assignee: Intel Corporation, Santa Clara, AZ (US)

( * ) Notice: Subject to any disclaimer, the term of this patent is extended or adjusted under 35 U.S.C. 154(b) by 76 days.

(21) Appl. No.: 13/799,553

(22) Filed: Mar. 13, 2013

(65) Prior Publication Data

US 2014/0283119 A1 Sep. 18, 2014

(51) Int. Cl.
*G06F 21/76* (2013.01)
*G06F 21/10* (2013.01)
*H04L 9/32* (2006.01)
*G06F 21/85* (2013.01)

(52) U.S. Cl.
CPC .............. *G06F 21/76* (2013.01); *G06F 21/10* (2013.01); *G06F 21/85* (2013.01); *H04L 9/32* (2013.01); *G06F 2221/034* (2013.01)

(58) Field of Classification Search
CPC ......... G06F 21/10; G06F 21/76; G06F 21/85; H04L 9/32; H04L 63/428
USPC .......................................................... 726/28
See application file for complete search history.

(56) References Cited

U.S. PATENT DOCUMENTS

| 5,425,102 | A | * | 6/1995 | Moy | 713/183 |
| 6,035,404 | A | * | 3/2000 | Zhao | 726/6 |
| 6,161,162 | A | * | 12/2000 | DeRoo | G06F 9/30101 710/244 |
| 6,195,689 | B1 | * | 2/2001 | Bahlmann | 709/217 |
| 6,957,229 | B1 | * | 10/2005 | Dyor | 1/1 |
| 7,124,301 | B1 | * | 10/2006 | Uchida | 713/189 |
| 7,240,339 | B2 | * | 7/2007 | Cragun et al. | 717/143 |
| 8,756,672 | B1 | * | 6/2014 | Allen et al. | 726/7 |
| 8,868,923 | B1 | * | 10/2014 | Hamlet | H04L 9/00 326/8 |
| 9,032,476 | B2 | * | 5/2015 | Potkonjak | G06F 21/34 726/2 |
| 2003/0088779 | A1 | * | 5/2003 | Kelley et al. | 713/184 |
| 2003/0129965 | A1 | * | 7/2003 | Siegel | G06F 21/10 455/411 |
| 2003/0196167 | A1 | * | 10/2003 | Dewar | G06Q 10/04 715/223 |
| 2004/0025027 | A1 | * | 2/2004 | Balard et al. | 713/183 |
| 2004/0139030 | A1 | * | 7/2004 | Stoll | G06F 21/6218 705/75 |
| 2005/0039039 | A1 | * | 2/2005 | Moyer et al. | 713/200 |
| 2005/0091520 | A1 | * | 4/2005 | Khan et al. | 713/194 |
| 2005/0196165 | A1 | * | 9/2005 | Dybsetter et al. | 398/22 |
| 2007/0005693 | A1 | * | 1/2007 | Sampath et al. | 709/204 |
| 2007/0180493 | A1 | * | 8/2007 | Croft | G06F 3/1415 726/2 |

(Continued)

*Primary Examiner* — Hadi Armouche
*Assistant Examiner* — Shahriar Zarrineh
(74) *Attorney, Agent, or Firm* — Trop, Pruner & Hu, P.C.

(57) ABSTRACT

In accordance with some embodiments, multiple blind debug passwords are provided. Each of a plurality of interested entities may have its own password and each password may unlock a specific set of features offered by an integrated circuit. In some embodiments each entity does not know the other passwords of the other entities. Potentially interested entities include an integrated circuit end customer, the original equipment manufacturer, the entity that provided the features to the integrated circuit and a conditional access provider. All debug features may be controlled solely via access to the debug tiers which are accessed by multiple debug passwords. Lower tier passwords are required in order to access higher tiers. Debug features may be separated into multiple tiers with more intrusive access requiring multiple debug passwords in order to gain access.

21 Claims, 4 Drawing Sheets

(56) References Cited

U.S. PATENT DOCUMENTS

| | | | |
|---|---|---|---|
| 2007/0199055 A1* | 8/2007 | Hashimoto et al. ............... 726/5 |
| 2007/0250920 A1* | 10/2007 | Lindsay .................. G06F 21/31 726/7 |
| 2008/0120564 A1* | 5/2008 | Balasubramanian et al. 715/771 |
| 2008/0177821 A1* | 7/2008 | Tsao ............................. 709/201 |
| 2008/0271122 A1* | 10/2008 | Nolan ..................... G06F 21/32 726/4 |
| 2008/0313345 A1* | 12/2008 | Bernardin et al. ............ 709/235 |
| 2009/0132985 A1* | 5/2009 | Hsu et al. ........................ 716/10 |
| 2010/0115596 A1* | 5/2010 | Horozov ................. G06F 21/10 726/7 |
| 2010/0199077 A1* | 8/2010 | Case ................... G06F 11/3656 713/1 |
| 2010/0268961 A1* | 10/2010 | Cole et al. ...................... 713/186 |
| 2013/0066945 A1* | 3/2013 | Das et al. ....................... 709/203 |
| 2013/0227677 A1* | 8/2013 | Pal ......................... G06F 21/33 726/19 |

\* cited by examiner

TIERED ACCESS TO ON CHIP FEATURES

BACKGROUND

This relates generally to integrated circuits (i.e. chips) that selectively provide a variety of different features.

Various integrated circuits may have many different selectable features. For example, a system on a chip may have a wide variety of capabilities. Different interested parties may have different interests in various ones of these features. For example, a chip manufacturer may need to be able to manufacture the chips, test the chips and perform failure analysis on customer returns. An original equipment manufacturer may need to do failure analysis. Thus, in different cases, different parties may need different levels of access to debug mechanisms.

Currently, a password may be provided to unlock access to the Joint Test Action Group (JTAG) interface. Then additional fuses may be provided to protect each debug feature once the JTAG access is granted. Examples of this include boundary scan (BSCAN), memory built-in self-test (mBIST), VISA, and OMAR debugging technologies.

BRIEF DESCRIPTION OF THE DRAWINGS

Some embodiments are described with respect to the following figures.

DETAILED DESCRIPTION

Figure 1:
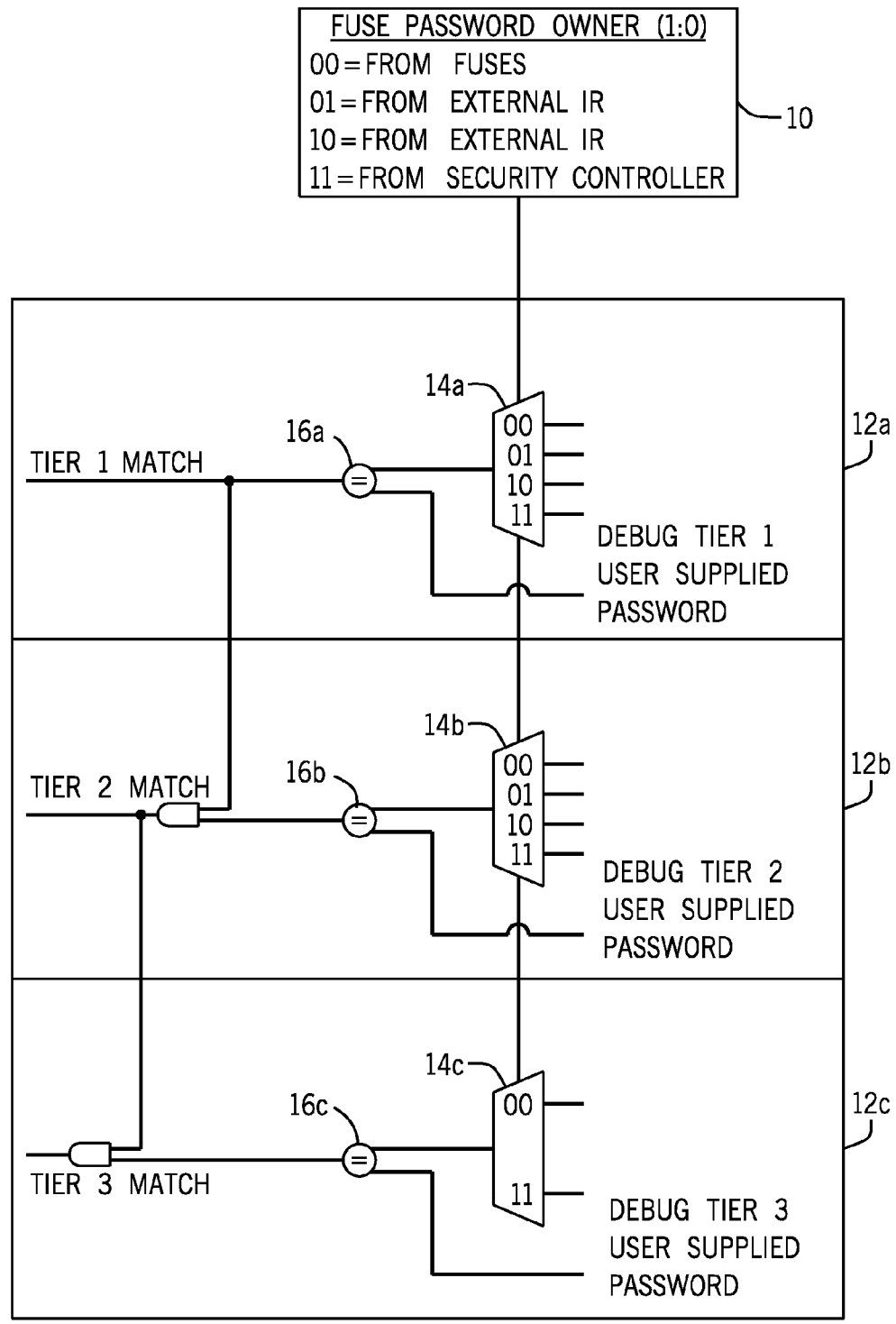
FIG. 1 is a schematic depiction of one embodiment.

In accordance with some embodiments, multiple blind (i.e. each entity has its own password) debug passwords are provided. Each of a plurality of interested entities may have its own password and each password may unlock a specific set of features offered by an integrated circuit. In some embodiments each entity does not know the other passwords of the other entities. Potentially interested entities include an integrated circuit end customer, the original equipment manufacturer, the entity that provided the features to the integrated circuit and a conditional access provider. All debug features may be controlled solely via access to the debug tiers which are accessed by multiple debug passwords. Lower tier passwords are required in order to access higher tiers. Debug features may be separated into multiple tiers with more intrusive access requiring multiple debug passwords in order to gain access.

Thus, in one example, there may be three debug passwords which create four debug tiers. In one embodiment, the lowest tier would have no protection and would enable public accessibility via the JTAG interface. In tier 1, a N bit password may be used to gain access. A typical user of this tier would be a repair center. When a cable box or satellite box is returned by a customer, a repair center can use the tier 1 debug features to reprogram flash memory to recover the device.

Tier 2 may be protected by a N bit password. When both tier 1 and tier 2 passwords are provided, this tier may be accessed by a customer who uses the integrated circuit to develop products. The customer may receive the product from a repair center for analysis and can use the same feature set accessible by the repair center plus additional debug features.

Finally, the tier 3 level may be protected by a N bit password where the tier 1, tier 2, and tier 3 passwords all must be applied. This may be the access level of the integrated circuit manufacturer. A manufacturer may receive the product back for failure analysis and will obtain all the passwords to gain full access to the device.

Each tiered password may have a separate enable bit. The ownership for each debug passwords can be unique. The manufacturer may always own the highest tiered debug password for accessing tier 3 and when the integrated circuit leaves the manufacturer, that password is programmed and the tier 3 password is enabled.

In one embodiment, the passwords for the different tiers have different numbers of bits. In one embodiment, the number of password bits per tier increases with increasing security tiers.

A typical usage model for a tiered debug password scheme is as follows. If an end customer brings a device in for service at a local repair center, that repair center may have the ability to obtain the tier 1 debug password to perform tests and to do additional debugging, like re-flashing the basic input/output system to recover the device. If the problem is not root-caused, then the device can be sent back to the original equipment manufacturer for debugging. The original equipment manufacturer may use both tier 1 and tier 2 passwords. If the problem is still not root caused and failure analysis is required, then the original equipment manufacturer can send the device back to the chip manufacturer which may use all three debug passwords to access more debug features.

As the ownership of the debug passwords can be different for the different tiers, at each stage of the process, the debug passwords are supplied from the debug password owner on request, in one embodiment. This provides knowledge of where the device is, what debug is being performed, and allows the password owner to withdraw the device from its network, if desired for security reasons.

Thus, in one embodiment, different features can be unlocked with each password. A fully unlocked chip may be in tier 0 and a chip in tier 3 has full debug capability. Thus, in one embodiment, the tier 0 may provide chip-unique identification codes, serial numbers, debugging tier 1, 2 and 3 password registers, and vendor and customer key signatures. Tier 0 may be JTAG locked, may include a JTAG password enable and may be unlocked and not password enabled, in different embodiments. Tier 1 may be a boundary scan tier which may not be JTAG locked, may include conditional access to JTAG password enable, and may not be locked and not password enabled, in different embodiments. Tier 2 may be for enabling customer fusing and customer debug features such as OMAR. It may not be JTAG locked or JTAG password enabled, may be conditional access and it may be not locked and not password enabled. The third tier may include manufacture fusing, manufacture visible features such as OMAR, fuse override registers, transaction registers, IDVP, JTAG network, mBIST, SCAN, VISA/chipwatcher, JTAG, VISA/chipwatcher MMR, test modes, and DFT_PAD. Again, it may not be JTAG locked, may have conditional access, and may not be locked and not password enabled.

The tiered passwords can come from different sources. The unlocking of features may be hierarchical. In other words, if a tier 1 password is not provided, then tier 2 and tier 3 debug features cannot be unlocked. If the manufacturer needs access to the part, it may have to get tier 1 and tier 2 debug passwords from customers prior to entering the tier 3 password.

Thus, referring to FIG. 1, a plurality of password sources are available as indicated in block 10. In this example four password sources are possible using two bits. One password source (0, 0) is from fuses, another (0, 1) is from an a first external source, another (1, 0) is from a second external source, and another (1, 1) is from a security controller. When the password owner is identified, the appropriate multiplexers 14a, 14b, and/or 14c may be operational to receive a password input on its four inputs in this example. Of course other numbers of inputs may also be possible. A master password may also be provided separately simply to access all the tiers. This master password would generally be available through the manufacturer.

Thus, to access a tier 1 level, the tier 1 password would be entered in module 12a, a multiplexer 14a, and if correctly entered, tier 1 capabilities would be provided.

If additional features are needed, a tier 2 password may be entered in the module 12b. This would allow access to both tier 2 and tier 1 since the tier 1 password had already been entered. Finally, the tier 3 password may be entered in the module 12c and the multiplexer 14c. If the preceding tier 1 and tier 2 passwords were correctly entered, access to the tier 3 levels may be obtained.

Figure 2:
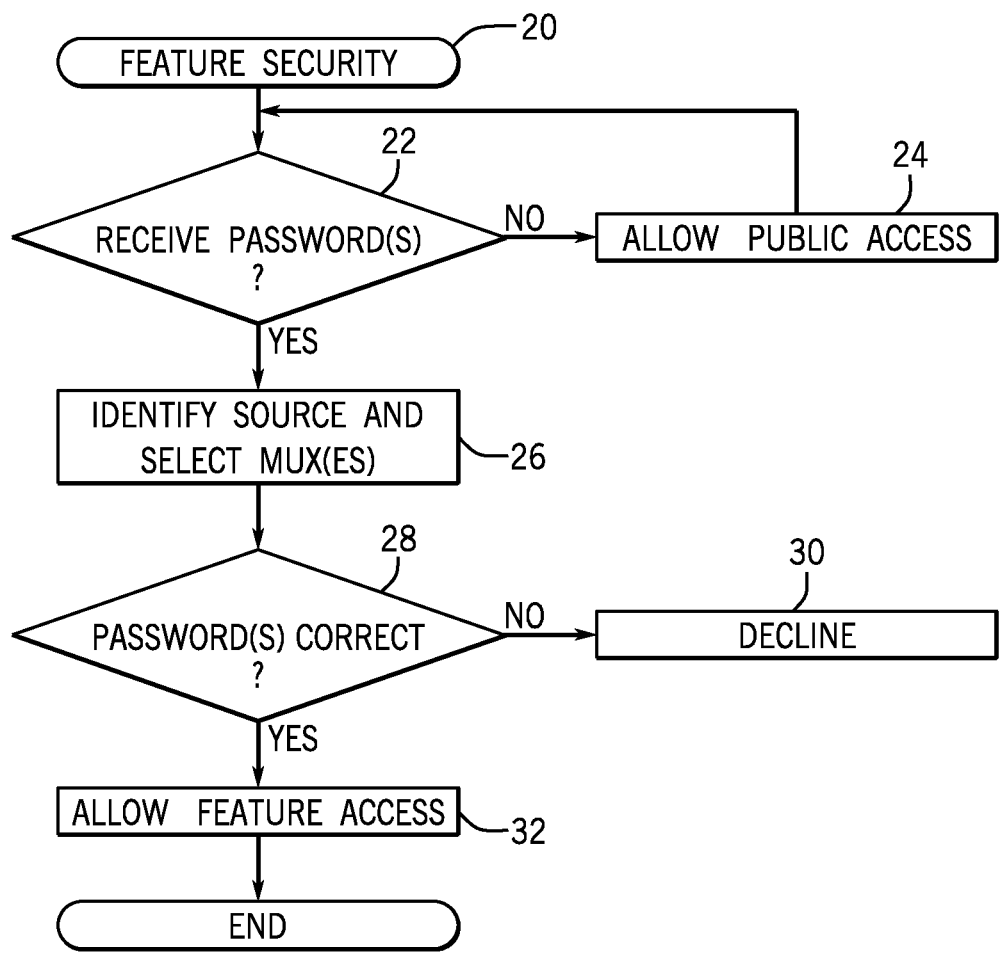
FIG. 2 is a flow chart for one embodiment.

Referring to FIG. 2, the sequence 20 may be implemented in software, firmware and/or hardware. In software and firmware embodiments it may be implemented by computer executed instructions stored in one or more non-transitory computer readable media such as magnetic, optical or semi-conductor storages.

The sequence 20 begins by receiving one or more passwords as indicated in diamond 22. If the passwords are not received, public access may still be allowed via block 24 in some embodiments. If the passwords are received, the sources may be identified using their two-bit codes in one embodiment and the appropriate multiplexer selected as indicated in block 26. Then a check at diamond 28 determines whether the correct passwords have been entered. If not, access may be declined as indicated in block 30. Otherwise, feature access may be allowed to the extent of the highest entered password as indicated in block 32.

Figure 3:
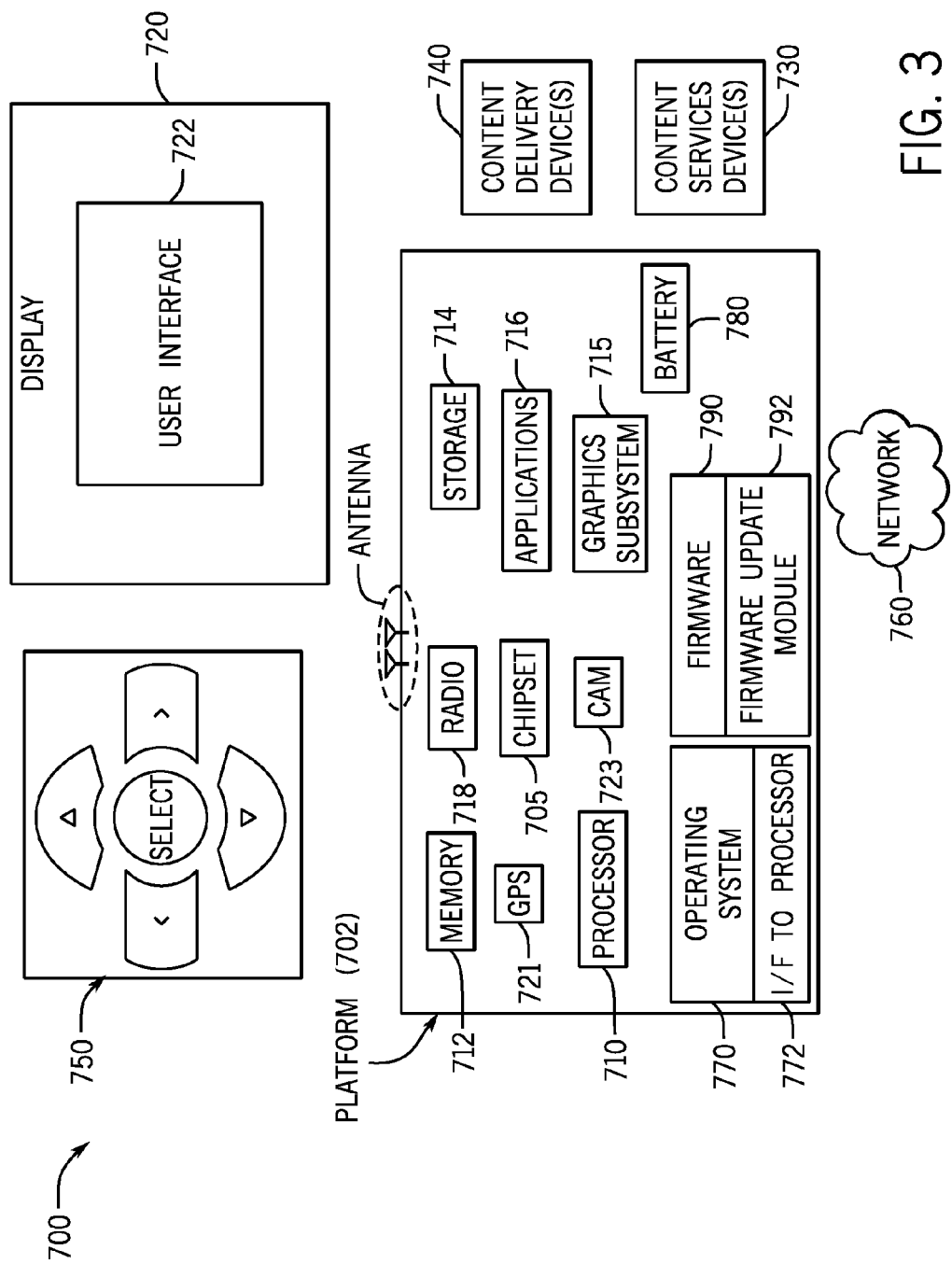
FIG. 3 is a system depiction for one embodiment.

FIG. 3 illustrates an embodiment of a system 700. In embodiments, system 700 may be a media system although system 700 is not limited to this context. For example, system 700 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In embodiments, system 700 comprises a platform 702 coupled to a display 720. Platform 702 may receive content from a content device such as content services device(s) 730 or content delivery device(s) 740 or other similar content sources. A navigation controller 750 comprising one or more navigation features may be used to interact with, for example, platform 702 and/or display 720. Each of these components is described in more detail below.

In embodiments, platform 702 may comprise any combination of a chipset 705, processor 710, memory 712, storage 714, graphics subsystem 715, applications 716 and/or radio 718. Chipset 705 may provide intercommunication among processor 710, memory 712, storage 714, graphics subsystem 715, applications 716 and/or radio 718. For example, chipset 705 may include a storage adapter (not depicted) capable of providing intercommunication with storage 714.

Processor 710 may be implemented as Complex Instruction Set Computer (CISC) or Reduced Instruction Set Computer (RISC) processors, x86 instruction set compatible processors, multi-core, or any other microprocessor or central processing unit (CPU). In embodiments, processor 710 may comprise dual-core processor(s), dual-core mobile processor(s), and so forth. The processor may implement the sequence of FIG. 2 together with memory 712.

Memory 712 may be implemented as a volatile memory device such as, but not limited to, a Random Access Memory (RAM), Dynamic Random Access Memory (DRAM), or Static RAM (SRAM).

Storage 714 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In embodiments, storage 714 may comprise technology to increase the storage performance enhanced protection for valuable digital media when multiple hard drives are included, for example.

Graphics subsystem 715 may perform processing of images such as still or video for display. Graphics subsystem 715 may be a graphics processing unit (GPU) or a visual processing unit (VPU), for example. An analog or digital interface may be used to communicatively couple graphics subsystem 715 and display 720. For example, the interface may be any of a High-Definition Multimedia Interface, DisplayPort, wireless HDMI, and/or wireless HD compliant techniques. Graphics subsystem 715 could be integrated into processor 710 or chipset 705. Graphics subsystem 715 could be a stand-alone card communicatively coupled to chipset 705.

The graphics and/or video processing techniques described herein may be implemented in various hardware architectures. For example, graphics and/or video functionality may be integrated within a chipset. Alternatively, a discrete graphics and/or video processor may be used. As still another embodiment, the graphics and/or video functions may be implemented by a general purpose processor, including a multi-core processor. In a further embodiment, the functions may be implemented in a consumer electronics device.

Radio 718 may include one or more radios capable of transmitting and receiving signals using various suitable wireless communications techniques. Such techniques may involve communications across one or more wireless networks. Exemplary wireless networks include (but are not limited to) wireless local area networks (WLANs), wireless personal area networks (WPANs), wireless metropolitan area network (WMANs), cellular networks, and satellite networks. In communicating across such networks, radio 718 may operate in accordance with one or more applicable standards in any version.

In embodiments, display 720 may comprise any television type monitor or display. Display 720 may comprise, for example, a computer display screen, touch screen display, video monitor, television-like device, and/or a television. Display 720 may be digital and/or analog. In embodiments, display 720 may be a holographic display. Also, display 720 may be a transparent surface that may receive a visual projection. Such projections may convey various forms of information, images, and/or objects. For example, such projections may be a visual overlay for a mobile augmented reality (MAR) application. Under the control of one or more software applications 716, platform 702 may display user interface 722 on display 720.

In embodiments, content services device(s) 730 may be hosted by any national, international and/or independent service and thus accessible to platform 702 via the Internet, for example. Content services device(s) 730 may be coupled to platform 702 and/or to display 720. Platform 702 and/or content services device(s) 730 may be coupled to a network 760 to communicate (e.g., send and/or receive) media information to and from network 760. Content delivery device(s) 740 also may be coupled to platform 702 and/or to display 720.

In embodiments, content services device(s) 730 may comprise a cable television box, personal computer, network, telephone, Internet enabled devices or appliance capable of delivering digital information and/or content, and any other similar device capable of unidirectionally or bidirectionally communicating content between content providers and platform 702 and/display 720, via network 760 or directly. It will be appreciated that the content may be communicated unidirectionally and/or bidirectionally to and from any one of the components in system 700 and a content provider via network 760. Examples of content may include any media information including, for example, video, music, medical and gaming information, and so forth.

Content services device(s) 730 receives content such as cable television programming including media information, digital information, and/or other content. Examples of content providers may include any cable or satellite television or radio or Internet content providers. The provided examples are not meant to limit embodiments of the invention.

In embodiments, platform 702 may receive control signals from navigation controller 750 having one or more navigation features. The navigation features of controller 750 may be used to interact with user interface 722, for example. In embodiments, navigation controller 750 may be a pointing device that may be a computer hardware component (specifically human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 750 may be echoed on a display (e.g., display 720) by movements of a pointer, cursor, focus ring, or other visual indicators displayed on the display. For example, under the control of software applications 716, the navigation features located on navigation controller 750 may be mapped to virtual navigation features displayed on user interface 722, for example. In embodiments, controller 750 may not be a separate component but integrated into platform 702 and/or display 720. Embodiments, however, are not limited to the elements or in the context shown or described herein.

In embodiments, drivers (not shown) may comprise technology to enable users to instantly turn on and off platform 702 like a television with the touch of a button after initial boot-up, when enabled, for example. Program logic may allow platform 702 to stream content to media adaptors or other content services device(s) 730 or content delivery device(s) 740 when the platform is turned "off." In addition, chip set 705 may comprise hardware and/or software support for 5.1 surround sound audio and/or high definition 7.1 surround sound audio, for example. Drivers may include a graphics driver for integrated graphics platforms. In embodiments, the graphics driver may comprise a peripheral component interconnect (PCI) Express graphics card.

In various embodiments, any one or more of the components shown in system 700 may be integrated. For example, platform 702 and content services device(s) 730 may be integrated, or platform 702 and content delivery device(s) 740 may be integrated, or platform 702, content services device(s) 730, and content delivery device(s) 740 may be integrated, for example. In various embodiments, platform 702 and display 720 may be an integrated unit. Display 720 and content service device(s) 730 may be integrated, or display 720 and content delivery device(s) 740 may be integrated, for example. These examples are not meant to limit the invention.

In various embodiments, system 700 may be implemented as a wireless system, a wired system, or a combination of both. When implemented as a wireless system, system 700 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 700 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and so forth. Examples of wired communications media may include a wire, cable, metal leads, printed circuit board (PCB), backplane, switch fabric, semiconductor material, twisted-pair wire, co-axial cable, fiber optics, and so forth.

Platform 702 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 3.

Figure 4:
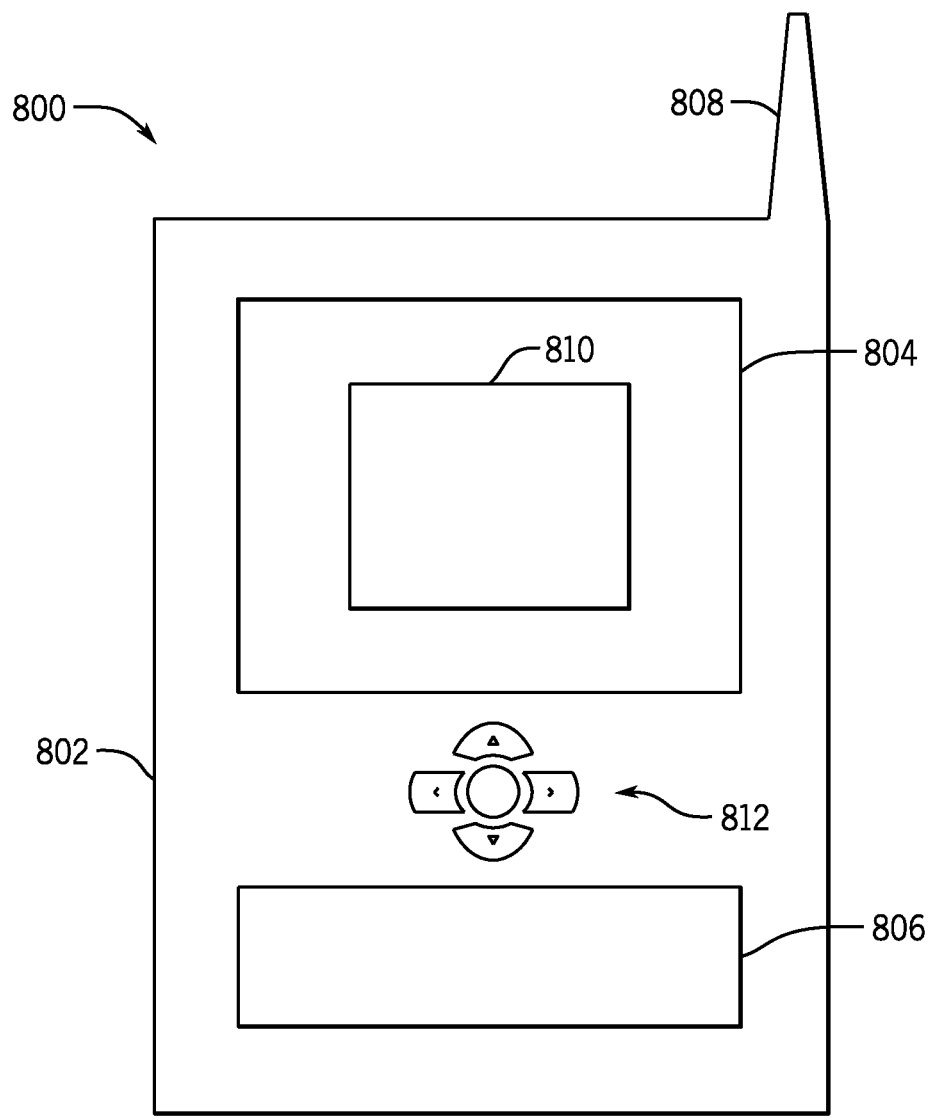
FIG. 4 is a front elevational view for the embodiment shown in FIG. 3 in accordance with one embodiment.

As described above, system 700 may be embodied in varying physical styles or form factors. FIG. 4 illustrates embodiments of a small form factor device 800 in which system 700 may be embodied. In embodiments, for example, device 800 may be implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

The processor 710 may communicate with a camera 722 and a global positioning system sensor 720, in some embodiments. A memory 712, coupled to the processor 710, may store computer readable instructions for implementing the sequences shown in FIG. 2 in software and/or firmware embodiments.

As shown in FIG. 4, device 800 may comprise a housing 802, a display 804, an input/output (I/O) device 806, and an antenna 808. Device 800 also may comprise navigation features 812. Display 804 may comprise any suitable display unit for displaying information appropriate for a mobile computing device. I/O device 806 may comprise any suitable I/O device for entering information into a mobile computing device. Examples for I/O device 806 may include an alphanumeric keyboard, a numeric keypad, a touch pad, input keys, buttons, switches, rocker switches, microphones, speakers, voice recognition device and software, and so forth. Information also may be entered into device 800 by way of microphone. Such information may be digitized by a voice recognition device. The embodiments are not limited in this context.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

The following clauses and/or examples pertain to further embodiments:

One example embodiment may be an apparatus comprising a fuse array, and a controller to limit access to said fuse array, said controller to provide at least two tiers of access, to different information, each tier requiring a different password. The apparatus may include said controller to require a first password to access each of said tiers and a second password to access only one of said tiers. The apparatus may include at least three tiers, each involving different passwords. The apparatus may include said controller to enable use of a master password to access both tiers. The apparatus may include said apparatus limits access to debug information. The apparatus may include each password allows access to a particular feature set. The apparatus may include each higher tier requires the same passwords used to access lower tiers and an additional password. The apparatus may include a public password-free tier. The apparatus may include an operating system. The apparatus may include a battery. The apparatus may include firmware and a module to update said firmware.

In another example embodiment may be a method comprising providing at least two tiers of access to a fuse array, each tier storing different information, and requiring a different password for each tier. The method may include requiring a first password to access each of said tiers and a second password to access only one of said tiers. The method may also include using at least three tiers and requiring a different password for each tier. The method may also include enabling use of a master password to access both tiers. The method may also include limiting access to debug information. The method may also include access via each password to a particular feature set. The method may also include requiring one password that is the same for each of said three tiers and, in addition, requiring an additional password for at least one of said higher tiers. The method may also include providing a public password free tier.

Another example embodiment may be one or more non-transitory computer readable media storing instructions executed by a processor to perform a sequence comprising providing at least two tiers of access to a fuse array, each tier storing different information, and requiring a different password for each tier. The computer readable media of claim 20, said sequence including requiring a first password to access each of said tiers and a second password to access only one of said tiers. The computer readable media of claim 20, said sequence including using at least three tiers and requiring a different password for each tier. The computer readable media of claim 20, said sequence including enabling use of a master password to access both tiers. The computer readable media of claim 20, said sequence including limiting access to debug information. The computer readable media of claim 22, said sequence including allowing access via each password to a particular feature set. The computer readable media of claim 22, said sequence including requiring one password that is the same for each of said three tiers and, in addition, requiring an additional password for at least one of said higher tiers. The computer readable media of claim 22, said sequence including providing a public password free tier.

The graphics processing techniques described herein may be implemented in various hardware architectures. For example, graphics functionality may be integrated within a chipset. Alternatively, a discrete graphics processor may be used. As still another embodiment, the graphics functions may be implemented by a general purpose processor, including a multicore processor.

References throughout this specification to "one embodiment" or "an embodiment" mean that a particular feature, structure, or characteristic described in connection with the embodiment is included in at least one implementation encompassed within this disclosure. Thus, appearances of the phrase "one embodiment" or "in an embodiment" are not necessarily referring to the same embodiment. Furthermore, the particular features, structures, or characteristics may be instituted in other suitable forms other than the particular embodiment illustrated and all such forms may be encompassed within the claims of the present application.

While certain embodiments have been depicted, those skilled in the art will appreciate numerous modifications and variations therefrom. It is intended that the appended claims cover all such modifications and variations as fall within the true spirit and scope of this disclosure.

What is claimed is:

1. An apparatus comprising:
   a fuse array;
   a controller to limit access to said fuse array, said controller to provide at least a public password-free tier for viewing only and password accessed three tiers with access to different feature sets in each tier, each tier requiring a different password, one of said passwords including more bits than the other password, such that accessing a first tier requires a first password, accessing a second tier requires the first password and a second password and accessing a third tier requires the first and second passwords and a third password;
   a multiplexer to receive a two bit user identification code which identifies one of four types of users, each user having a different two bit user identification code; and
   a gate to determine whether both the user identification code and the correct password for that user have been received, each of the four users having an assigned combination of a two bit identification code and one or more passwords, such one user can access all three tiers and the other users can access less through all the tiers.

2. The apparatus of claim 1, wherein said at least three password accessed tiers, including a tier for a repair center, a tier for an original equipment manufacturer and a tier for a chip manufacturer.

3. The apparatus of claim 1, said controller to enable use of a master password to access both tiers.

4. The apparatus of claim 1 wherein said apparatus limits access to debug information.

5. The apparatus of claim 1 including an operating system.

6. The apparatus of claim 1 including a battery.

7. The apparatus of claim 1 including firmware and a module to update said firmware.

8. A method comprising:
   limiting access to a fuse array;
   providing at least a public password-free tier for viewing only and password accessed three tiers with access to different feature sets in each tier, each tier requiring a different password, one of said passwords including more bits than the other password, one of said passwords including more bits than the other password, such that accessing a first tier requires a first password, accessing a second tier requires the first password and a second password and accessing a third tier requires the first and second passwords and a third password;
   receiving a two bit user identification code which identifies one of four types of users, each user having a different two bit user identification code; and
   determining whether both the user identification code and the correct password for that user have been received, each of the four users having an assigned combination of a two bit identification code and one or more passwords, such one user can access all three tiers and the other users can access less through all the tiers.

9. The method of claim 8 including using at least three tiers and requiring a different password for each tier.

10. The method of claim 8 including enabling use of a master password to access both tiers.

11. The method of claim 8 including limiting access to debug information.

12. The method of claim 9 including allowing access via each password to a particular feature set.

13. The method of claim 9 including requiring one password that is the same for each of said three tiers and, in addition, requiring an additional password for at least one of said higher tiers.

14. The method of claim 9 including providing a public password free tier.

15. One or more non-transitory computer readable media storing instructions executed by a processor to perform a sequence comprising:
   limiting access to a fuse array;
   providing at least a public password-free tier for viewing only and password accessed three tiers with accesses to different feature sets in each tier, each tier requiring a different password, one of said passwords including more bits than the other password such that accessing a first tier requires a first password, accessing a second tier requires the first password and a second password and accessing a third tier requires the first and second passwords and a third password;
   receiving a two bit user identification code which identifies one of four types of users, each user having a different two bit user identification code; and
   determining whether both the user identification code and the correct password for that user have been received, each of the four users having an assigned combination of a two bit identification code and one or more passwords, such one user can access all three tiers and the other users can access less through all the tiers.

16. The computer readable media of claim 15, said sequence including using at least three tiers and requiring a different password for each tier.

17. The computer readable media of claim 15, said sequence including enabling use of a master password to access both tiers.

18. The computer readable media of claim 15, said sequence including limiting access to debug information.

19. The computer readable media of claim 16, said sequence including allowing access via each password to a particular feature set.

20. The computer readable media of claim 16, said sequence including requiring one password that is the same for each of said three tiers and, in addition, requiring an additional password for at least one of said higher tiers.

21. The computer readable media of claim 16, said sequence including providing a public password free tier.

* * * * *